United States Patent
Hwang et al.

(10) Patent No.: US 9,005,823 B2
(45) Date of Patent: Apr. 14, 2015

(54) ELECTROLYTE FOR RECHARGEABLE LITHIUM BATTERY AND RECHARGEABLE LITHIUM BATTERY INCLUDING THE SAME

(75) Inventors: Duck-Chul Hwang, Yongin-si (KR); Eun-Gi Shim, Seongnam-si (KR); Jong-Hyun Lee, Seongnam-si (KR); Jong-Su Kim, Seongnam-si (KR); Young-Min Kim, Yongin-si (KR)

(73) Assignees: Samsung SDI Co., Ltd., Yongin-si (KR); Soulbrain Co., Ltd., Seongnam-si (KR)

( * ) Notice: Subject to any disclaimer, the term of this patent is extended or adjusted under 35 U.S.C. 154(b) by 512 days.

(21) Appl. No.: 13/241,133

(22) Filed: Sep. 22, 2011

(65) Prior Publication Data

US 2012/0282531 A1    Nov. 8, 2012

Related U.S. Application Data

(60) Provisional application No. 61/482,536, filed on May 4, 2011.

(51) Int. Cl.
*H01M 6/16*   (2006.01)
*H01M 4/13*   (2010.01)
*H01M 4/58*   (2010.01)
*H01M 10/0567*  (2010.01)
*H01M 4/36*   (2006.01)
*H01M 4/38*   (2006.01)
*H01M 4/48*   (2010.01)
*H01M 4/587*  (2010.01)
*H01M 10/052*  (2010.01)

(52) U.S. Cl.
CPC .......... *H01M 10/0567* (2013.01); *H01M 4/362* (2013.01); *H01M 4/386* (2013.01); *H01M 4/483* (2013.01); *H01M 4/587* (2013.01); *H01M 10/052* (2013.01)

(58) Field of Classification Search
CPC ..... H01M 4/134; H01M 4/362; H01M 4/364; H01M 4/587; H01M 4/625; H01M 10/0564–10/0569
USPC ............... 429/188, 218.1, 232, 324, 337, 341
See application file for complete search history.

(56) References Cited

U.S. PATENT DOCUMENTS

| | | | |
|---|---|---|---|
| 7,491,471 B2 | 2/2009 | Yamaguchi et al. | |
| 7,846,588 B2 * | 12/2010 | Jung et al. | 429/330 |
| 2005/0106470 A1 * | 5/2005 | Yoon et al. | 429/324 |
| 2006/0068287 A1 | 3/2006 | Morita et al. | |

(Continued)

FOREIGN PATENT DOCUMENTS

| | | | |
|---|---|---|---|
| JP | 11054150 A | * | 2/1999 |
| JP | 2002298912 A | * | 10/2002 |

(Continued)

OTHER PUBLICATIONS

Machine translation for Kasahara et al., JP 2008-004460 A.*

(Continued)

*Primary Examiner* — Edu E Enin-Okut
(74) *Attorney, Agent, or Firm* — Christie, Parker & Hale, LLP

(57) ABSTRACT

An electrolyte for a rechargeable lithium battery includes a non-aqueous organic solvent, a lithium salt, and an additive. The additive includes a gamma butyrolactone compound substituted with at least one F atom at the α-position.

10 Claims, 1 Drawing Sheet

(56) References Cited

U.S. PATENT DOCUMENTS

| | | |
|---|---|---|
| 2007/0037063 A1 | 2/2007 | Choi et al. |
| 2010/0119956 A1* | 5/2010 | Tokuda et al. ............ 429/338 |
| 2011/0008681 A1* | 1/2011 | Koh et al. ................ 429/331 |

FOREIGN PATENT DOCUMENTS

| | | | |
|---|---|---|---|
| JP | 2004161638 A * | 6/2004 | |
| JP | 2008004460 A * | 1/2008 | |
| JP | 2008153117 A * | 7/2008 | |
| KR | 10-2005-0008446 A | 1/2005 | |
| KR | 10-2006-0051615 A | 5/2006 | |
| KR | 10-2007-0006955 | 1/2007 | |
| KR | 2008065561 A * | 7/2008 | .......... H01M 10/052 |
| WO | WO 2008126800 A1 * | 10/2008 | ............ H01M 10/40 |
| WO | WO 2009035085 A1 * | 3/2009 | |

OTHER PUBLICATIONS

Machine translation for Sasaki et al., JP 2002-298912 A.*
Machine translation for Sasaki et al., JP 2004-161638 A.*
"γ-Valerolactone." ChemSpider. Royal Society of Chemistry. Web. Sep. 24, 2014. <http://www.chemspider.com/Chemical-Structure.7633.html?rid=e3753b54-94ca-466f-85e9-6b258086abf9>.*
Derwent Abstract for Ahn et al., KR 2008065561 A.*

* cited by examiner

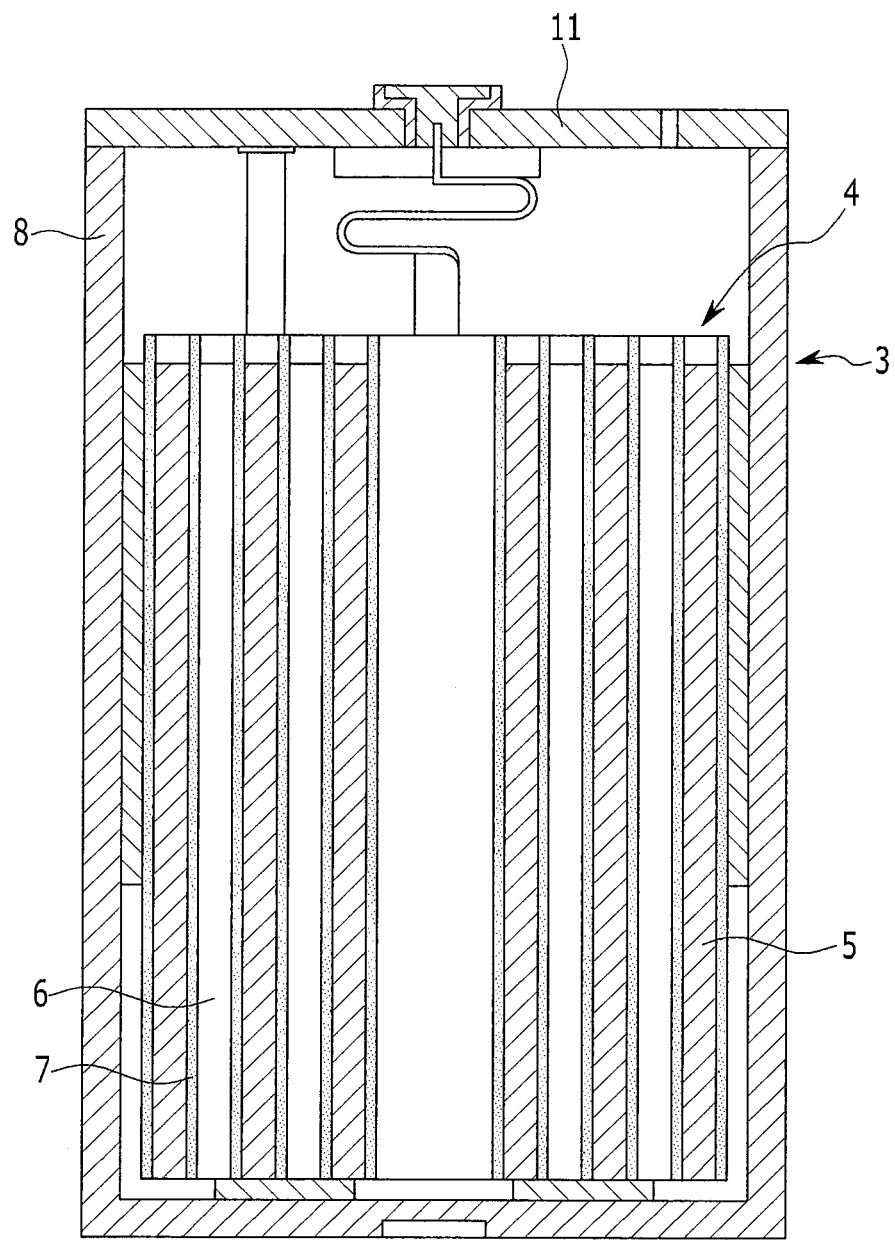

ELECTROLYTE FOR RECHARGEABLE LITHIUM BATTERY AND RECHARGEABLE LITHIUM BATTERY INCLUDING THE SAME

CROSS-REFERENCE TO RELATED APPLICATIONS

This application claims the benefit of U.S. Provisional Application No. 61/482,536, filed on May 4, 2011, in the United States Patent and Trademark Office, the entire content of which is incorporated herein in by reference.

BACKGROUND

1. Technical Field

This disclosure relates to electrolytes for rechargeable lithium batteries and to rechargeable lithium batteries including the same.

2. Description of the Related Art

Lithium rechargeable batteries have recently drawn attention as power sources for small portable electronic devices. They use organic electrolyte solutions and thereby have twice the discharge voltage of conventional batteries using alkaline aqueous solutions, and accordingly have high energy density.

A rechargeable lithium battery is made by injecting an electrolyte into a battery cell including a positive electrode including a positive active material that can intercalate and deintercalate lithium, and a negative electrode including a negative active material that can intercalate and deintercalate lithium. For the electrolyte, a lithium salt is dissolved in an organic solvent, and has limited ability to improve cell performance when the lithium ion battery is allowed to stand at high temperatures.

SUMMARY

In some embodiments, an electrolyte for a rechargeable lithium battery has high voltage and good high temperature storage characteristics.

In other embodiments, a rechargeable lithium battery includes the electrolyte.

According to some embodiments, an electrolyte for a rechargeable lithium battery includes a non-aqueous organic solvent; a lithium salt; and an additive including a compound represented by the following Chemical Formula 1.

Chemical Formula 1

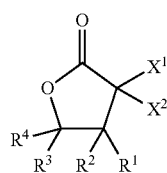

In Chemical Formula 1, each of $X^1$ and $X^2$ is independently a halogen or hydrogen, provided that at least one of $X^1$ and $X^2$ is F. Each of $R^1$ to $R^3$ is hydrogen, and $R^4$ is hydrogen, or a substituted or unsubstituted C1 to C10 alkyl group.

In Chemical Formula 1, $R^4$ may be a substituted or unsubstituted C1 to C10 alkyl group. In some embodiments, for example, $R^4$ may be a substituted or unsubstituted C1 to C5 alkyl group.

In some embodiments, the additive includes α-fluoro gammabutyrolactone, α,α-difluoro gammabutyrolactone, α,α-difluoro-γ-methyl gammabutyrolactone, α,α-difluoro-γ-butyl gammabutyrolactone, α,α-difluoro-γ-hexyl gammabutyrolactone, and combinations thereof.

The additive may be included in the electrolyte in an amount of about 0.5 to about 10 parts by weight based on 100 parts by weight of the non-aqueous organic solvent and the lithium salt.

According to other embodiments, a rechargeable lithium battery includes a positive electrode including a positive active material; a negative electrode including a negative active material; and an electrolyte including a non-aqueous organic solvent, a lithium salt, and an additive including the compound represented by Chemical Formula 1.

The negative active material may include a Si-based active material, a carbon-based active material, or a combination thereof.

The Si-based active material may include Si, $SiO_x$ (0<x<2), a Si—Y alloy (where Y is an element selected from alkali metals, alkaline-earth metals, group 13 through group 16 elements, transition elements, rare earth elements, and combinations thereof, but Y is not Si), $SiO_x$ (0<x<2) coated with carbon, a Si—C composite, or a combination thereof. The carbon-based active material may include graphite, soft carbon, hard carbon, a mesophase pitch carbonized product, fired coke, or a combination thereof. As used herein, the term "graphite" refers to natural graphite, artificial graphite, or a combination thereof. As used herein, and as understood by those of ordinary skill in the art, the term $SiO_x$ (0<x<2) refers to $SiO_x$ oxides in which x is between 0 and 2, and to Si—$SiO_2$ composites. Also, the $SiO_x$ may be amorphous or crystalline.

In embodiments in which the negative active material includes a combination of Si-based and carbon-based active materials, the negative active material may include about 1 to about 99 wt % of the Si-based active material and about 1 to about 99 wt % of the carbon-based active material.

Rechargeable lithium batteries according to embodiments of the present invention have high voltage and good high temperature storage characteristics.

BRIEF DESCRIPTION OF THE DRAWINGS

FIG. 1 is a schematic cross-sectional view of a rechargeable lithium battery according to an embodiment of the present invention.

DETAILED DESCRIPTION OF THE INVENTION

Exemplary embodiments will now be described. However, these embodiments are only exemplary, and the present invention is not limited thereto.

An electrolyte for a rechargeable lithium battery according to some embodiments includes a non-aqueous organic solvent, a lithium salt, and an additive.

In some embodiments, the additive is added to the lithium salt and dissolved in the non-aqueous organic solvent. The resulting rechargeable lithium battery has high voltage and improved stability when allowed to stand at high temperatures.

The additive includes a compound represented by the following Chemical Formula 1.

Chemical Formula 1

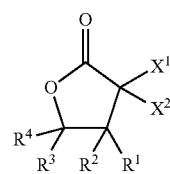

In Chemical Formula 1, each of $X^1$ and $X^2$ is independently a halogen or hydrogen, provided that at least one of $X^1$ and $X^2$ is F.

According to some embodiments, the additive includes a gamma butyrolactone compound structure substituted with at least one F atom. In some embodiments, at least one position selected from $X^1$ and $X^2$ (i.e., the α-position) in Chemical Formula 1 is substituted with F. In gamma butyrolactone compounds, when hydrogen is present at the α-position, hydrogen gas is generated, thereby causing battery swelling at high temperatures However, according to embodiments of the present invention, at least one of the hydrogen atoms at the α-position is substituted with F to block at least some of the hydrogen gas generation. This improves battery stability even if the rechargeable lithium battery is allowed to stand at high temperatures. Accordingly, when F is substituted at a predetermined position (for example, at the α-position), the rechargeable lithium battery may have improved high temperature stability.

In Chemical Formula 1, each of $R^1$ to $R^3$ is hydrogen. $R^4$ is hydrogen, or a substituted or unsubstituted C1 to C10 alkyl group. In some embodiments, for example, $R^4$ is a substituted or unsubstituted C1 to C10 alkyl group. In other embodiments, $R^4$ may be a substituted or unsubstituted C1 to C5 alkyl group.

When a gamma butyrolactone compound having at least one F substituted at the α-position is substituted with a C1 to C10 alkyl group at the γ-position (i.e., the $R^4$ position), the alkyl group may stabilize the F present at the α-position. This may further prevent battery swelling and further improve the high temperature stability of the rechargeable lithium battery.

Nonlimiting examples of the additive include α-fluoro gammabutyrolactone, α,α-difluoro gammabutyrolactone, α,α-difluoro-γ-methyl gammabutyrolactone, α,α-difluoro-γ-butyl gammabutyrolactone, α,α-difluoro-γ-hexyl gammabutyrolactone, and combinations thereof. In some embodiments, in the effort to improve high temperature safety, the additive may be α,α-difluoro gamma butyrolactone rather than α-fluoro gammabutyrolactone. In other embodiments, α,α-difluoro-γ-methyl gamma butyrolactone, α,α-difluoro-γ-butyl gamma butyrolactone, or α,α-difluoro-γ-hexyl gamma butyrolactone (which are substituted with an alkyl group at the γ-position) rather than α-fluoro gammabutyrolactone.

The additive may be included in the electrolyte in an amount of about 0.5 to about 10 parts by weight, based on 100 parts by weight of the non-aqueous organic solvent and the lithium salt. In some embodiments, for example, the additive may be included in the electrolyte in an amount of about 2 to about 10 parts by weight based on 100 parts by weight of the non-aqueous organic solvent and the lithium salt. Even adding a small amount of the additive may improve the high temperature storage characteristics of the rechargeable lithium battery.

The non-aqueous organic solvent acts as a medium for transmitting ions taking part in the electrochemical reaction of the battery. Nonlimiting examples of the non-aqueous organic solvent may include carbonate-based, ester-based, ether-based, ketone-based, alcohol-based, and aprotic solvents.

Nonlimiting examples of the carbonate-based solvent include linear carbonate compounds such as dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), and the like; cyclic carbonate compounds such as ethylene carbonate (EC), propylene carbonate (PC), butylene carbonate (BC), and the like; and combinations of linear and cyclic carbonate compounds.

When a mixture of linear carbonate compound(s) and cyclic carbonate compound(s) is used, the solvent may simultaneously have a high dielectric constant and low viscosity. In some embodiments, the cyclic carbonate compound and linear carbonate compound may be mixed at a volume ratio of about 1:1 to about 1:9.

Nonlimiting examples of the ester-based solvent include methylacetate, ethylacetate, n-propylacetate, dimethylacetate, methylpropionate, ethylpropionate, decanolide, valerolactone, mevalonolactone, caprolactone, and the like. Nonlimiting examples of the ether solvent include dibutylether, tetraglyme, diglyme, dimethoxyethane, 2-methyltetrahydrofuran, tetrahydrofuran, and the like. Nonlimiting examples of the ketone-based solvent include cyclohexanone, and the like. Nonlimiting examples of the alcohol-based solvent include ethanol, isopropyl alcohol, and the like.

A single non-aqueous organic solvent may be used, or a mixture of solvents may be used. When the organic solvent is a mixture, the mixture ratio can be adjusted in accordance with the desired battery performance.

The lithium salt supplies lithium ions in the battery, enables the basic operation of the rechargeable lithium battery, and improves lithium ion transport between the positive and negative electrodes. Nonlimiting examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, $LiB(C_2O_4)_2$ (lithium bis(oxalato) borate: LiBOB), and combinations thereof.

The lithium salt may be used at a concentration of about 0.1 M to about 2.0M. When the lithium salt is included at a concentration within this range, electrolyte performance and lithium ion mobility may be enhanced due to optimal electrolyte conductivity and viscosity.

FIG. 1 is a schematic view of a representative structure of a rechargeable lithium battery according to some embodiments of the present invention. Referring to FIG. 1, the rechargeable lithium battery 3 (depicted as a prismatic battery, but not limited thereto) includes an electrode assembly 4 in a battery case 8, an electrolyte injected through the upper portion of the case 8, and a cap plate 11 sealing the case 8. The electrode assembly 4 includes a positive electrode 5, a negative electrode 6, and a separator 7 positioned between the positive electrode 5 and the negative electrode 6. The rechargeable lithium battery according to embodiments of the present invention is not limited to prismatic type batteries, and may be formed in any of a variety of diverse shapes and types, such as cylindrical, coin-type, or pouch-type batteries, as long as the battery includes the electrolyte and operates as a battery.

The electrolyte is as described above.

The negative electrode includes a negative current collector and a negative active material layer disposed thereon.

The negative current collector may include a copper foil, but is not limited thereto.

The negative active material layer may include a negative active material, a binder, and optionally a conductive material.

The negative active material may include a Si-based active material, a carbon-based active material, or a combination thereof. Among these materials, in the interest of achieving high temperature stability, in some embodiments, a Si-based active material may be used rather than a carbon-based active material, or a mixture of a Si-based active material and a carbon-based active material may be used. According to some embodiments, when the electrolyte includes a gamma butyrolactone compound substituted with at least one F at the α-position, including a Si-based active material may improve the high temperature stability of the battery to a greater extent than including a mixture of a Si-based active material and a carbon-based active material. Also, includes a gamma butyrolactone compound substituted with at least one F at the α-position, including a mixture of a Si-based active material and a carbon-based active material may improve the high temperature stability of the battery to a greater extent than including a carbon-based active material.

The Si-based active material may be a material having high capacity and high voltage. The carbon-based active material may be a material having good cycle-life characteristics. When both the Si-based active material and the carbon-based active material are used, the battery may have high capacity, high voltage, and good cycle-life characteristics.

In some embodiments, the Si-based active material may include Si, $SiO_x$ (0<x<2), a Si—Y alloy (where Y is an element selected from alkali metals, alkaline-earth metals, group 13 through group 16 elements, transition elements, rare earth elements, and combinations thereof, but Y is not Si), $SiO_x$ (0<x<2) coated with carbon, a Si—C composite, or a combination thereof. As used herein, and as understood by those of ordinary skill in the art, the term $SiO_x$ (0<x<2) refers to $SiO_x$ oxides in which x is between 0 and 2, and to Si—$SiO_2$ composites. Also, the $SiO_x$ may be amorphous or crystalline.

When the rechargeable lithium battery includes a Si-based negative active material and an electrolyte including a gamma butyrolactone compound substituted with at least one F at the α-position, according to embodiments of the present invention, the rechargeable lithium battery may have high capacity, high voltage and good high temperature stability.

In some embodiments, the carbon-based active material may include graphite, soft carbon, hard carbon, a mesophase pitch carbonized product, fired coke, or a combination thereof. The graphite may be non-shaped, sheet-shaped, flake-shaped, spherical or fiber-shaped. As used herein, the term "graphite" refers to natural graphite, artificial graphite, or a combination thereof.

When a rechargeable lithium battery includes a carbon-based negative active material and an electrolyte solution including a gamma butyrolactone compound substituted with at least one F at the α-position, according to embodiments of the present invention, the rechargeable lithium battery may have high capacity, high voltage and good high temperature stability.

When the negative active material includes a mixture of Si-based active material(s) and carbon-based active material(s), the Si-based active material(s) may be included in an amount of about 1 to about 99 wt %, and the carbon-based active material(s) may be included in an amount of about 1 to about 99 wt %. In some embodiments, the Si-based active material(s) may be included in an amount of about 10 to about 90 wt %, and the carbon-based active material(s) may be included in an amount of about 10 to about 90 wt %. Within these ranges, a rechargeable lithium battery having high-capacity, high voltage, and good high temperature stability may be provided.

The binder improves the binding properties of the negative active material particles with one another and with a current collector. Nonlimiting examples of the binder include polyvinyl alcohol, carboxymethyl cellulose, hydroxypropyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, polyamideimide, polyacrylic acid, and the like.

The conductive material may be included to improve electrode conductivity. Any electrically conductive material may be used as a conductive material so long as it does not cause a chemical change. Nonlimiting examples of the conductive material include carbon-based materials such as graphite, carbon black, acetylene black, ketjen black, carbon fibers, and the like; metal-based materials of a metal powder or metal fiber including copper, nickel, aluminum, silver, and the like; conductive polymers such as polyphenylene derivatives; and mixtures thereof.

The positive electrode includes a current collector and a positive active material layer disposed on the current collector. The positive active material layer includes a positive active material, a binder, and optionally a conductive material.

The current collector may include Al (aluminum), but is not limited thereto.

The positive active material includes lithiated intercalation compounds that reversibly intercalate and deintercalate lithium ions. The positive active material may include a composite oxide including at least one element selected from cobalt, manganese, and nickel, as well as lithium. Nonlimiting examples of suitable positive active materials include those represented by the below formulae.

$Li_aA_{1-b}B_bD_2$ (0.90≤a≤1.8 and 0≤b≤0.5)

$Li_aE_{1-b}B_bO_{2-c}D_c$ (0.90≤a≤1.8, 0≤b≤0.5, and 0≤c≤0.05)

$LiE_{2-b}B_bO_{4-c}D_c$ (0≤b≤0.5, and 0≤c≤0.05)

$Li_aNi_{1-b-c}Co_bB_cD_\alpha$ (0.90≤a≤1.8, 0≤b≤0.5, 0≤c≤0.05, and 0≤α≤2)

$Li_aNi_{1-b-c}Co_bB_cO_{2-\alpha}F_\alpha$ (0.90≤a≤1.8, 0≤b≤0.5, 0≤c≤0.05, and 0≤α≤2)

$Li_aNi_{1-b-c}Co_bB_cO_{2-\alpha}F_2$ (0.90≤a≤1.8, 0≤b≤0.5, 0≤c≤0.05, and 0≤α≤2)

$Li_aNi_{1-b-c}Mn_bB_cD_\alpha$ (0.90≤a≤1.8, 0≤b≤0.5, 0≤c≤0.05, and 0≤α≤2)

$Li_aNi_{1-b-c}Mn_bB_cO_{2-\alpha}F_\alpha$ (0.90≤a≤0.8, 0≤b≤0.5, 0≤c≤0.05, and 0≤α≤2)

$Li_aNi_{1-b-c}Mn_bB_cO_{2-\alpha}F_2$ (0.90≤a≤1.8, 0≤b≤0.5, 0≤c≤0.05, and 0≤α≤2)

$Li_aNi_bE_cG_dO_2$ (0.90≤a≤1.8, 0≤b≤0.9, 0≤c≤0.5, and 0.001≤d≤0.1)

$Li_aNi_bCo_cMn_dGeO_2$ (0.90≤a≤1.8, 0≤b≤0.9, 0≤c≤0.5, 0≤d≤0.5, 0.001≤e≤0.1)

$Li_aNiG_bO_2$ (0.90≤a≤1.8, 0.001≤b≤0.1)

$Li_aCoG_bO_2$ (0.90≤a≤1.8, 0.001≤b≤0.1)

$Li_aMnG_bO_2$ (0.90≤a≤1.8, 0.001≤b≤0.1)

$Li_aMn_2G_bO_4$ (0.90≤a≤1.8, and 0.001≤b≤0.1)

$QO_2$ $QS_2$ $LiQS_2$ $V_2O_5$ $LiV_2O_5$ $LiIO_2$ $LiNiVO_4$ $Li_{(3-f)}J_2(PO_4)_3 (0 \leq f \leq 2)$ $Li_{(3-f)}Fe_2(PO_4)_3 (0 \leq f \leq 2)$ $LiFePO_4$.

In the above chemical formulae, A may be Ni, Co, Mn, or a combination thereof. B may be Al, Ni, Co, Mn, Cr, Fe, Mg, Sr, V, a rare earth element, or a combination thereof. D may be O, F, S, P, or a combination thereof. E may be Co, Mn, or a combination thereof. F may be F, S, P, or a combination thereof. G may be Al, Cr, Mn, Fe, Mg, La, Ce, Sr, V, or a combination thereof. Q may be Ti, Mo, Mn, or a combination thereof. I may be Cr, V, Fe, Sc, Y, or a combination thereof. J may be V, Cr, Mn, Co, Ni, Cu, or a combination thereof.

The positive active material may include a positive active material coated with a coating layer, or a compound of the active material and active material coated with the coating layer. The coating layer may include at least one coating element compound selected from oxides and hydroxides of the coating element, oxyhydroxides of the coating element, oxycarbonates of the coating element, and hydroxycarbonates of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, and mixtures thereof. The coating process may include any conventional process as long as it does not cause any side effects on the properties of the positive active material. The coating processes are known to those of ordinary skill in the art, but some exemplary coating methods include spray coating, and immersion.

The binder improves the binding properties of the positive active material particles to each other and to a current collector. Nonlimiting examples of the binder include polyvinyl alcohol, carboxymethyl cellulose, hydroxypropyl cellulose, diacetyl cellulose, polyvinyl chloride, carboxylated polyvinyl chloride, polyvinyl fluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, polyamideimide, polyacrylic acid, and the like.

The conductive material improves the electrical conductivity of the positive electrode. Any electrically conductive material can be used as the conductive agent so long as it does not cause a chemical change. Nonlimiting examples of the conductive material include graphite; carbon black; acetylene black; ketjen black; carbon fibers; polyphenylene derivatives; metal powders or metal fibers of copper, nickel, aluminum, silver, and the like; and combinations thereof.

The negative electrode and positive electrode may be fabricated by mixing the active material, conductive material, and binder to form an active material composition, and coating the composition on a current collector. The electrode manufacturing method is known to those of ordinary skill in the art. The solvent can be N-methylpyrrolidone but it is not limited thereto.

The separator may be formed as a single layer or a multi-layer, and may be made of polyethylene, polypropylene, polyvinylidene fluoride, or a combination thereof.

The rechargeable lithium battery has a high charge voltage of about 4.3 to about 4.4V.

The following Examples are presented for illustrative purposes only, and do not limit the scope of the present invention.

Furthermore, what is not described in this specification can be sufficiently understood by those of ordinary skill in the art.

Examples 1 to 25 and Comparative Examples 1 to 22

A positive active material of $LiCoO_2$, a binder of polyvinylidene fluoride (PVDF), and a conductive material of Super-P were mixed in a weight ratio of 94:3:3 and dispersed in N-methyl-2-pyrrolidone to provide a positive active material layer composition. The positive active material layer composition was coated on an aluminum foil having a thickness of 12 μm, and dried and pressed to provide a positive electrode.

A negative active material of carbon-coated $SiO_x$ (where x is between 0 and 2) and a binder of polyamide imide (PAI) were mixed in a weight ratio of 90:10 and dispersed in N-methyl-2-pyrrolidone to provide a negative active material layer composition. The negative active material layer composition was coated on a copper foil having a thickness of 12 μm, and dried and pressed to provide a negative electrode.

$LiPF_6$ having a concentration of 1.3 M was dissolved in a solution of ethylene carbonate (EC), ethylmethyl carbonate (EMC), and diethyl carbonate (DEC) mixed in a volume ratio of 3:2:5. The additives listed in Table 1 below were added to the electrolyte in the amounts shown in the Table to provide electrolytes. In the Table, "GBL" refers to gamma butyrolactone.

The obtained positive electrodes and negative electrodes were wound with a separator, and compressed and inserted into prismatic cans which were then injected with the respective electrolyte solution to provide the rechargeable lithium battery cells of Examples 1 through 25 and Comparative Examples 1 through 22.

Evaluation 1: Evaluation of High Temperature Stability of the Rechargeable Lithium Battery Cells Each rechargeable lithium battery cell obtained from Examples 1 to 25 and Comparative Examples 1 to 22 was charged at 0.2 C and discharged at 0.2 C once (battery process). In addition, each cell was charged at 0.5 C and discharged at 0.2 C once (standard process), and the standard capacity (i.e., the discharge capacity after the standard process) was measured. The results are shown in Table 1 below. The charge voltage was 4.35V and the discharge voltage was 2.5V.

Then, the rechargeable lithium battery cells were charged at 0.5 C and allowed to stand in an oven at 60° C. for 4 weeks, and discharged at 0.2 C. The capacity retention (%) was measured, and the results are shown in Table 1 below. The capacity retention (%) refers to the percentage of the capacity (relative to the standard capacity) after the cell was allowed to stand at 60° C. for 4 weeks.

TABLE 1

| | Additive (parts by weight*) | | | | | | | | | |
|---|---|---|---|---|---|---|---|---|---|---|
| | GBL | α-fluoro GBL | β-fluoro GBL | γ-fluoro GBL | α,α-difluoro GBL | α,α-difluoro-γ-methyl GBL | α,α-difluoro-γ-butyl GBL | α,α-difluoro-γ-hexyl GBL | Standard capacity (mAh) | Capacity retention (%) |
| Comp. Ex. 1 | 0 | — | — | — | — | — | — | — | 1400 | 50 |
| Comp. Ex. 2 | 0.3 | — | — | — | — | — | — | — | 1400 | 52 |

TABLE 1-continued

| | Additive (parts by weight*) | | | | | | | Standard capacity (mAh) | Capacity retention (%) |
|---|---|---|---|---|---|---|---|---|---|
| | GBL | α-fluoro GBL | β-fluoro GBL | γ-fluoro GBL | α,α-difluoro GBL | α,α-difluoro-γ-methyl GBL | α,α-difluoro-γ-butyl GBL | α,α-difluoro-γ-hexyl GBL | | |
| Comp. Ex. 3 | 0.5 | — | — | — | — | — | — | — | 1400 | 55 |
| Comp. Ex. 4 | 1 | — | — | — | — | — | — | — | 1400 | 60 |
| Comp. Ex. 5 | 3 | — | — | — | — | — | — | — | 1400 | 65 |
| Comp. Ex. 6 | 5 | — | — | — | — | — | — | — | 1400 | 69 |
| Comp. Ex. 7 | 10 | — | — | — | — | — | — | — | 1400 | 70 |
| Comp. Ex. 8 | 15 | — | — | — | — | — | — | — | 1400 | 53 |
| Ex. 1 | — | 0.5 | — | — | — | — | — | — | 1400 | 71 |
| Ex. 2 | — | 1 | — | — | — | — | — | — | 1400 | 73 |
| Ex. 3 | — | 3 | — | — | — | — | — | — | 1400 | 76 |
| Ex. 4 | — | 5 | — | — | — | — | — | — | 1400 | 87 |
| Ex. 5 | — | 10 | — | — | — | — | — | — | 1400 | 80 |
| Comp. Ex. 9 | — | — | 0.3 | — | — | — | — | — | 1400 | 52 |
| Comp. Ex. 10 | — | — | 0.5 | — | — | — | — | — | 1400 | 56 |
| Comp. Ex. 11 | — | — | 1 | — | — | — | — | — | 1400 | 59 |
| Comp. Ex. 12 | — | — | 3 | — | — | — | — | — | 1400 | 65 |
| Comp. Ex. 13 | — | — | 5 | — | — | — | — | — | 1400 | 69 |
| Comp. Ex. 14 | — | — | 10 | — | — | — | — | — | 1400 | 70 |
| Comp. Ex. 15 | — | — | 15 | — | — | — | — | — | 1400 | 54 |
| Comp. Ex. 16 | — | — | — | 0.3 | — | — | — | — | 1400 | 51 |
| Comp. Ex. 17 | — | — | — | 0.5 | — | — | — | — | 1400 | 55 |
| Comp. Ex. 18 | — | — | — | 1 | — | — | — | — | 1400 | 60 |
| Comp. Ex. 19 | — | — | — | 3 | — | — | — | — | 1400 | 64 |
| Comp. Ex. 20 | — | — | — | 5 | — | — | — | — | 1400 | 68 |
| Comp. Ex. 21 | — | — | — | 10 | — | — | — | — | 1400 | 70 |
| Comp. Ex. 22 | — | — | — | 15 | — | — | — | — | 1400 | 55 |
| Ex. 6 | — | — | — | — | 0.5 | — | — | — | 1400 | 71 |
| Ex. 7 | — | — | — | — | 1 | — | — | — | 1400 | 74 |
| Ex. 8 | — | — | — | — | 3 | — | — | — | 1400 | 79 |
| Ex. 9 | — | — | — | — | 5 | — | — | — | 1400 | 92 |
| Ex. 10 | — | — | — | — | 10 | — | — | — | 1400 | 86 |
| Ex. 11 | — | — | — | — | — | 0.5 | — | — | 1400 | 71 |
| Ex. 12 | — | — | — | — | — | 1 | — | — | 1400 | 74 |
| Ex. 13 | — | — | — | — | — | 3 | — | — | 1400 | 80 |
| Ex. 14 | — | — | — | — | — | 5 | — | — | 1400 | 91 |
| Ex. 15 | — | — | — | — | — | 10 | — | — | 1400 | 86 |
| Ex. 16 | — | — | — | — | — | — | 0.5 | — | 1400 | 71 |
| Ex. 17 | — | — | — | — | — | — | 1 | — | 1400 | 75 |
| Ex. 18 | — | — | — | — | — | — | 3 | — | 1400 | 80 |
| Ex. 19 | — | — | — | — | — | — | 5 | — | 1400 | 92 |
| Ex. 20 | — | — | — | — | — | — | 10 | — | 1400 | 87 |
| Ex. 21 | — | — | — | — | — | — | — | 0.5 | 1400 | 71 |
| Ex. 22 | — | — | — | — | — | — | — | 1 | 1400 | 75 |
| Ex. 23 | — | — | — | — | — | — | — | 3 | 1400 | 81 |
| Ex. 24 | — | — | — | — | — | — | — | 5 | 1400 | 91 |
| Ex. 25 | — | — | — | — | — | — | — | 10 | 1400 | 86 |

* parts by weight: based on total 100 parts by weight of EC/EMC/DEC mixed solution and $LiPF_6$ Table 1 shows results for rechargeable lithium battery cells including a Si-based negative active material. As seen from Table 1, the cells according to Examples 1 to 25 (including electrolytes having additives of gamma butyrolactone substituted with at least one F at the α-position) had higher capacity retention than the cells of Comparative Examples 1 to 22 (including electrolytes having additives of gamma butyrolactone not substituted with F in the α-position). From these results, it is understood that the rechargeable lithium battery cells according to embodiments of the present invention have good high temperature stability. Indeed, the rechargeable lithium battery cells according to embodiments of the present invention have significantly improved high temperature stability.

Examples 26 to 50 and Comparative Examples 23 to 44

A positive active material of LiCoO$_2$, a binder of polyvinylidene fluoride (PVDF), and a conductive material of Super-P were mixed in a weight ratio of 94:3:3 and dispersed in N-methyl-2-pyrrolidone to provide a positive active material layer composition. The positive active material layer composition was coated on an aluminum foil having a thickness of 12 μm, and dried and pressed to provide a positive electrode.

A negative active material of a mixture of carbon-coated SiO and graphite, and a binder of polyacrylic acid (PAA) were mixed in a weight ratio of 45:45:10 (carbon-coated SiO: graphite: PAA) and dispersed in N-methyl-2-pyrrolidone to provide a negative active material layer composition. The negative active material layer composition was coated on a copper foil having a thickness of 12 μm, and dried and pressed to provide a negative electrode.

LiPF$_6$ having a concentration of 1.3 M was dissolved in a solution of ethylene carbonate (EC), ethylmethyl carbonate (EMC), and diethyl carbonate (DEC) mixed in a volume ratio of 3:2:5. The additives listed in the below Table 2 were added to the mixture in the amounts listed in Table 2 to provide electrolytes. In the Table, "GBL" refers to gamma butyrolactone.

The obtained positive electrode and negative electrode were wound with a separator, and compressed and inserted into a prismatic can, which was then injected with the respective electrolyte to provide a rechargeable lithium battery cell.

Evaluation 2: Evaluation of High Temperature Stability of the Rechargeable Lithium Battery Cells Each rechargeable lithium battery cell obtained from Examples 26 to 50 and Comparative Examples 23 to 44 was measured in accordance with the same procedure as in Evaluation 1 to assess high temperature stability, and the results are shown in the following Table 2.

TABLE 2

| | Additive (parts by weight*) | | | | | | | | |
|---|---|---|---|---|---|---|---|---|---|
| | GBL | α-fluoro GBL | β-fluoro GBL | γ-fluoro GBL | α,α-difluoro GBL | α,α-difluoro-γ-methyl GBL | α,α-difluoro-γ-butyl GBL | α,α-difluoro-γ-hexyl GBL | standard capacity (mAh) | capacity retention (%) |
| Comp. Ex. 23 | 0 | — | — | — | — | — | — | — | 1400 | 58 |
| Comp. Ex. 24 | 0.3 | — | — | — | — | — | — | — | 1400 | 59 |
| Comp. Ex. 25 | 0.5 | — | — | — | — | — | — | — | 1400 | 64 |
| Comp. Ex. 26 | 1 | — | — | — | — | — | — | — | 1400 | 69 |
| Comp. Ex. 27 | 3 | — | — | — | — | — | — | — | 1400 | 71 |
| Comp. Ex. 28 | 5 | — | — | — | — | — | — | — | 1400 | 77 |
| Comp. Ex. 29 | 10 | — | — | — | — | — | — | — | 1400 | 73 |
| Comp. Ex. 30 | 15 | — | — | — | — | — | — | — | 1400 | 63 |
| Ex. 26 | — | 0.5 | — | — | — | — | — | — | 1400 | 78 |
| Ex. 27 | — | 1 | — | — | — | — | — | — | 1400 | 80 |
| Ex. 28 | — | 3 | — | — | — | — | — | — | 1400 | 86 |
| Ex. 29 | — | 5 | — | — | — | — | — | — | 1400 | 96 |
| Ex. 30 | — | 10 | — | — | — | — | — | — | 1400 | 90 |
| Comp. Ex. 31 | — | — | 0.3 | — | — | — | — | — | 1400 | 61 |
| Comp. Ex. 32 | — | — | 0.5 | — | — | — | — | — | 1400 | 65 |
| Comp. Ex. 33 | — | — | 1 | — | — | — | — | — | 1400 | 70 |
| Comp. Ex. 34 | — | — | 3 | — | — | — | — | — | 1400 | 73 |
| Comp. Ex. 35 | — | — | 5 | — | — | — | — | — | 1400 | 77 |
| Comp. Ex. 36 | — | — | 10 | — | — | — | — | — | 1400 | 75 |
| Comp. Ex. 37 | — | — | 15 | — | — | — | — | — | 1400 | 63 |

TABLE 2-continued

| | Additive (parts by weight*) | | | | | | | standard capacity (mAh) | capacity retention (%) |
|---|---|---|---|---|---|---|---|---|---|
| | GBL | α-fluoro GBL | β-fluoro GBL | γ-fluoro GBL | α,α-difluoro GBL | α,α-difluoro-γ-methyl GBL | α,α-difluoro-γ-butyl GBL | α,α-difluoro-γ-hexyl GBL | | |
| Comp. Ex. 38 | — | — | — | 0.3 | — | — | — | — | 1400 | 60 |
| Comp. Ex. 39 | — | — | — | 0.5 | — | — | — | — | 1400 | 66 |
| Comp. Ex. 40 | — | — | — | 1 | — | — | — | — | 1400 | 70 |
| Comp. Ex. 41 | — | — | — | 3 | — | — | — | — | 1400 | 71 |
| Comp. Ex. 42 | — | — | — | 5 | — | — | — | — | 1400 | 77 |
| Comp. Ex. 43 | — | — | — | 10 | — | — | — | — | 1400 | 75 |
| Comp. Ex. 44 | — | — | — | 15 | — | — | — | — | 1400 | 62 |
| Ex. 31 | — | — | — | — | 0.5 | — | — | — | 1400 | 78 |
| Ex. 32 | — | — | — | — | 1 | — | — | — | 1400 | 85 |
| Ex. 33 | — | — | — | — | 3 | — | — | — | 1400 | 90 |
| Ex. 34 | — | — | — | — | 5 | — | — | — | 1400 | 96 |
| Ex. 35 | — | — | — | — | 10 | — | — | — | 1400 | 93 |
| Ex. 36 | — | — | — | — | — | 0.5 | — | — | 1400 | 79 |
| Ex. 37 | — | — | — | — | — | 1 | — | — | 1400 | 85 |
| Ex. 38 | — | — | — | — | — | 3 | — | — | 1400 | 91 |
| Ex. 39 | — | — | — | — | — | 5 | — | — | 1400 | 97 |
| Ex. 40 | — | — | — | — | — | 10 | — | — | 1400 | 94 |
| Ex. 41 | — | — | — | — | — | — | 0.5 | — | 1400 | 78 |
| Ex. 42 | — | — | — | — | — | — | 1 | — | 1400 | 83 |
| Ex. 43 | — | — | — | — | — | — | 3 | — | 1400 | 92 |
| Ex. 44 | — | — | — | — | — | — | 5 | — | 1400 | 96 |
| Ex. 45 | — | — | — | — | — | — | 10 | — | 1400 | 93 |
| Ex. 46 | — | — | — | — | — | — | — | 0.5 | 1400 | 78 |
| Ex. 47 | — | — | — | — | — | — | — | 1 | 1400 | 86 |
| Ex. 48 | — | — | — | — | — | — | — | 3 | 1400 | 92 |
| Ex. 49 | — | — | — | — | — | — | — | 5 | 1400 | 96 |
| Ex. 50 | — | — | — | — | — | — | — | 10 | 1400 | 93 |

* parts by weight: based on total 100 parts by weight of EC/EMC/DEC mixed solution and $LiPF_6$.

Table 2 shows results for rechargeable lithium battery cells including a negative electrode including a mixture of Si-based active material and carbon-based active material. As seen in Table 2, the cells according to Examples 26 to 50 (including electrolytes having additives of gamma butyrolactone substituted with at least one F at the α-position) had higher capacity retention than the cells of Comparative Examples 23 to 44 (including electrolytes having additives of gamma butyrolactone not substituted with F at the α-position). From these results, it is understood that the rechargeable lithium battery cells according to embodiments of the present invention have good high temperature stability. Indeed, the rechargeable lithium battery cells according to embodiments of the present invention have significantly improved high temperature stability.

Examples 51 to 75 and Comparative Examples 45 to 66

A positive active material of $LiCoO_2$, a binder of polyvinylidene fluoride (PVDF), and a conductive material of Super-P were mixed in a weight ratio of 94:3:3 and dispersed in N-methyl-2-pyrrolidone to provide a positive active material layer composition. The positive active material layer composition was coated on an aluminum foil having a thickness of 12 μm, and dried and pressed to provide a positive electrode.

A negative active material of graphite, and a binder of styrene-butadiene rubber (SBR) and carboxymethyl cellulose (CMC) were mixed in a weight ratio of 98:1:1 (graphite: styrene-butadiene rubber: carboxymethyl cellulose) and dispersed in water to provide a negative active material layer composition. The negative active material layer composition was coated on a copper foil having a thickness of 12 μm, and dried and pressed to provide a negative electrode.

$LiPF_6$ having a concentration of 1.3 M was dissolved in a solution of ethylene carbonate (EC), ethylmethyl carbonate (EMC), and diethyl carbonate (DEC) mixed in a volume ratio of 3:2:5. The additives listed in Table 3 below were added in the amounts listed in Table 3 to provide electrolytes. In the Table, "GBL" refers to gamma butyrolactone.

The obtained positive electrode and negative electrode were wound with a separator, and compressed and inserted into a prismatic can which was injected with the electrolyte to provide rechargeable lithium battery cell.

Evaluation 3: Evaluation of High Temperature Stability of the Rechargeable Lithium Battery Cells Each rechargeable lithium battery cell obtained from Examples 51 to 75 and Comparative Examples 45 to 66 was measured in accordance with the same procedure as in Evaluation 1 to assess high temperature stability, and the results are shown in the following Table 3.

TABLE 3

| | additive (parts by weight*) | | | | | | | Standard capacity (mAh) | Capacity retention (%) |
|---|---|---|---|---|---|---|---|---|---|
| | GBL | α-fluoro GBL | β-fluoro GBL | ɣ-fluoro GBL | α,α-difluoro GBL | α,α-difluoro-ɣ-methyl GBL | α,α-difluoro-ɣ-butyl GBL | α,α-difluoro-ɣ-hexyl GBL | | |
| Comp. Ex. 45 | 0 | — | — | — | — | — | — | — | 1400 | 69 |
| Comp. Ex. 46 | 0.3 | — | — | — | — | — | — | — | 1400 | 73 |
| Comp. Ex. 47 | 0.5 | — | — | — | — | — | — | — | 1400 | 76 |
| Comp. Ex. 48 | 1 | — | — | — | — | — | — | — | 1400 | 78 |
| Comp. Ex. 49 | 3 | — | — | — | — | — | — | — | 1400 | 80 |
| Comp. Ex. 50 | 5 | — | — | — | — | — | — | — | 1400 | 81 |
| Comp. Ex. 51 | 10 | — | — | — | — | — | — | — | 1400 | 80 |
| Comp. Ex. 52 | 15 | — | — | — | — | — | — | — | 1400 | 71 |
| Ex. 51 | — | 0.5 | — | — | — | — | — | — | 1400 | 83 |
| Ex. 52 | — | 1 | — | — | — | — | — | — | 1400 | 90 |
| Ex. 53 | — | 3 | — | — | — | — | — | — | 1400 | 94 |
| Ex. 54 | — | 5 | — | — | — | — | — | — | 1400 | 96 |
| Ex. 55 | — | 10 | — | — | — | — | — | — | 1400 | 96 |
| Comp. Ex. 53 | — | — | 0.3 | — | — | — | — | — | 1400 | 72 |
| Comp. Ex. 54 | — | — | 0.5 | — | — | — | — | — | 1400 | 75 |
| Comp. Ex. 55 | — | — | 1 | — | — | — | — | — | 1400 | 79 |
| Comp. Ex. 56 | — | — | 3 | — | — | — | — | — | 1400 | 80 |
| Comp. Ex. 57 | — | — | 5 | — | — | — | — | — | 1400 | 81 |
| Comp. Ex. 58 | — | — | 10 | — | — | — | — | — | 1400 | 79 |
| Comp. Ex. 59 | — | — | 15 | — | — | — | — | — | 1400 | 72 |
| Comp. Ex. 60 | — | — | — | 0.3 | — | — | — | — | 1400 | 72 |
| Comp. Ex. 61 | — | — | — | 0.5 | — | — | — | — | 1400 | 76 |
| Comp. Ex. 62 | — | — | — | 1 | — | — | — | — | 1400 | 79 |
| Comp. Ex. 63 | — | — | — | 3 | — | — | — | — | 1400 | 80 |
| Comp. Ex. 64 | — | — | — | 5 | — | — | — | — | 1400 | 81 |
| Comp. Ex. 65 | — | — | — | 10 | — | — | — | — | 1400 | 79 |
| Comp. Ex. 66 | — | — | — | 15 | — | — | — | — | 1400 | 71 |
| Ex. 56 | — | — | — | — | 0.5 | — | — | — | 1400 | 86 |
| Ex. 57 | — | — | — | — | 1 | — | — | — | 1400 | 91 |
| Ex. 58 | — | — | — | — | 3 | — | — | — | 1400 | 96 |
| Ex. 59 | — | — | — | — | 5 | — | — | — | 1400 | 97 |
| Ex. 60 | — | — | — | — | 10 | — | — | — | 1400 | 94 |
| Ex. 61 | — | — | — | — | — | 0.5 | — | — | 1400 | 86 |
| Ex. 62 | — | — | — | — | — | 1 | — | — | 1400 | 92 |
| Ex. 63 | — | — | — | — | — | 3 | — | — | 1400 | 94 |
| Ex. 64 | — | — | — | — | — | 5 | — | — | 1400 | 96 |
| Ex. 65 | — | — | — | — | — | 10 | — | — | 1400 | 95 |
| Ex. 66 | — | — | — | — | — | — | 0.5 | — | 1400 | 85 |
| Ex. 67 | — | — | — | — | — | — | 1 | — | 1400 | 91 |
| Ex. 68 | — | — | — | — | — | — | 3 | — | 1400 | 93 |
| Ex. 69 | — | — | — | — | — | — | 5 | — | 1400 | 96 |
| Ex. 70 | — | — | — | — | — | — | 10 | — | 1400 | 93 |
| Ex. 71 | — | — | — | — | — | — | — | 0.5 | 1400 | 85 |
| Ex. 72 | — | — | — | — | — | — | — | 1 | 1400 | 90 |
| Ex. 73 | — | — | — | — | — | — | — | 3 | 1400 | 94 |
| Ex. 74 | — | — | — | — | — | — | — | 5 | 1400 | 96 |
| Ex. 75 | — | — | — | — | — | — | — | 10 | 1400 | 92 |

* parts by weight: based on total 100 parts by weight of EC/EMC/DEC mixed solution and LiPF$_6$.

Table 3 shows results for rechargeable lithium battery cells including a carbon-based negative active material. As seen in Table 3, the cells according to Examples 51 to 75 (including electrolytes with gamma butyrolactone additives substituted with at least one F at the α-position) had higher capacity retention than the cells of Comparative Examples 23 to 44 (including electrolytes with gamma butyrolactone additives not substituted with F in the α-position). From these results, it is understood that the rechargeable lithium battery cells according to embodiments of the present invention have good high temperature stability. Indeed, rechargeable lithium battery cells according to embodiments of the present invention have significantly improved high temperature stability.

Referring to Examples 1 to 75 in Tables 1 to 3, the cells including Si-based negative active materials showed greater improvements in high temperature stability (i.e., capacity retention) than the cells including mixtures of Si-based negative active materials and carbon-based negative active materials. Also, the electrolytes including mixtures of Si-based active materials and carbon-based active materials showed greater improvements in high temperature stability than the cells including carbon-based negative active materials.

While the present invention has been illustrated and described with reference to certain exemplary embodiments, it will be understood by those of ordinary skill in the art that various modifications and alterations may be made without departing from the spirit and scope of the present invention as defined by the appended claims.

What is claimed is:

1. A rechargeable lithium battery, comprising:
   a positive electrode comprising a positive active material;
   a negative electrode comprising a negative active material comprising a Si-based active material selected from the group consisting of:
   Si;
   $SiO_x$ wherein $0<x<2$;
   Si—Y alloys wherein Y is an element selected from the group consisting of alkali metals, alkaline-earth metals, group 13 through group 16 elements, transition elements, rare earth elements, and combinations thereof, but Y is not Si;
   carbon-coated $SiO_x$ wherein $0<x<2$;
   Si—C composites; and
   combinations thereof; and
   an electrolyte comprising:
   a non-aqueous organic solvent;
   a lithium salt; and
   an additive comprising a compound represented by Chemical Formula 1:

Chemical Formula 1

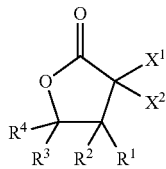

wherein:
   each of $X^1$ and $X^2$ is independently a halogen or hydrogen, provided that at least one of $X^1$ and $X^2$ is F,
   each of $R^1$ through $R^3$ is hydrogen, and
   $R^4$ is selected from the group consisting of unsubstituted butyl groups, and unsubstituted hexyl groups.

2. The rechargeable lithium battery of claim 1, wherein the additive is selected from the group consisting of α,α-difluoro-γ-butyl gammabutyrolactone, α,α-difluoro-γ-hexyl gammabutyrolactone, and combinations thereof.

3. The rechargeable lithium battery of claim 1, wherein the additive is present in the electrolyte in an amount of about 0.5 to about 10 parts by weight based on 100 parts by weight of the non-aqueous organic solvent and the lithium salt.

4. The rechargeable lithium battery of claim 1, wherein the additive is present in the electrolyte in an amount of about 2 to about 10 parts by weight based on 100 parts by weight of the non-aqueous organic solvent and the lithium salt.

5. The rechargeable lithium battery of claim 1, wherein the Si-based active material is selected from the group consisting of:
   Si;
   $SiO_x$ wherein $0<x<2$;
   carbon-coated $SiO_x$ wherein $0<x<2$;
   Si—C composites; and
   combinations thereof.

6. The rechargeable lithium battery of claim 1, wherein the Si-based active material comprises the carbon-coated $SiO_x$ wherein $0<x<2$.

7. The rechargeable lithium battery of claim 1, wherein the negative active material further comprises a carbon-based active material.

8. The rechargeable lithium battery of claim 7, wherein the carbon-based active material comprises graphite.

9. The rechargeable lithium battery of claim 1, wherein the negative active material comprises a combination of the Si-based active material and a carbon-based active material, the Si-based active material is present in the negative active material in an amount of about 1 wt % to about 99 wt %, and the carbon-based active material is present in the negative active material in an amount of about 1 wt % to about 99 wt %.

10. The rechargeable lithium battery of claim 1, wherein the negative active material comprises a combination of the Si-based active material and a carbon-based active material, the Si-based active material is present in the negative active material in an amount of about 10 wt % to about 90 wt %, and the carbon-based active material is present in the negative active material in an amount of about 10 wt % to about 90 wt %.

* * * * *